US009078096B2

(12) United States Patent
Clark et al.

(10) Patent No.: US 9,078,096 B2
(45) Date of Patent: Jul. 7, 2015

(54) SYSTEMS AND METHODS FOR CREATING AND PROVIDING LOCATION-BASED CONTENT

(71) Applicant: TravelStorysGPS, LLC, Wilson, WY (US)

(72) Inventors: Story Clark, Wilson, WY (US); Madeleine Quissek, Tetonia, ID (US)

(73) Assignee: TravelStorysGPS, LLC, Wilson, WY (US)

( * ) Notice: Subject to any disclaimer, the term of this patent is extended or adjusted under 35 U.S.C. 154(b) by 0 days.

(21) Appl. No.: 14/606,710

(22) Filed: Jan. 27, 2015

(65) Prior Publication Data

US 2015/0141059 A1  May 21, 2015

Related U.S. Application Data

(63) Continuation of application No. 14/470,778, filed on Aug. 27, 2014, now Pat. No. 8,965,410, which is a continuation of application No. 14/327,256, filed on Jul. 9, 2014, now abandoned.

(60) Provisional application No. 61/844,332, filed on Jul. 9, 2013.

(51) Int. Cl.
*H04W 4/02* (2009.01)
*H04W 4/20* (2009.01)

(52) U.S. Cl.
CPC .............. *H04W 4/02* (2013.01); *H04W 4/206* (2013.01); *H04W 4/023* (2013.01)

(58) Field of Classification Search
CPC ... G06Q 50/01; G06Q 30/02; G06Q 30/0261; H04L 67/18; H04L 67/22; H04L 12/588; H04L 51/32; H04W 4/02; H04W 4/206; H04W 4/023; H04W 4/185; G06F 19/3456; G06F 19/3481; G06F 21/6245
See application file for complete search history.

(56) References Cited

U.S. PATENT DOCUMENTS

| | | | |
|---|---|---|---|
| 6,577,714 B1 | 6/2003 | Darcie et al. |
| 7,039,389 B2 | 5/2006 | Johnson, Jr. |
| 7,461,353 B2 | 12/2008 | Rohrabaugh et al. |
| 7,720,596 B2 | 5/2010 | Kobuya et al. |
| 7,823,068 B2 | 10/2010 | Cowtan et al. |
| 7,979,204 B2 | 7/2011 | Kobuya et al. |
| 8,010,279 B2 | 8/2011 | Kobuya et al. |
| 8,090,459 B2 | 1/2012 | Hsu |
| 8,209,630 B2 | 6/2012 | Thimbleby et al. |
| 8,249,965 B2 | 8/2012 | Tumminaro |
| 8,386,165 B2 | 2/2013 | Kobuya et al. |
| 8,386,170 B2 | 2/2013 | James |
| 8,386,959 B2 | 2/2013 | Rohrabaugh et al. |

(Continued)

*Primary Examiner* — Nizar Sivji
(74) *Attorney, Agent, or Firm* — Lathrop & Gage LLP

(57) ABSTRACT

A software product comprises instructions stored on non-transitory computer-readable media. The instructions, when executed by a computer, perform steps for providing a guided tour to a user via a mobile computing device. The steps include the step of playing a first data file on the mobile computing device when the mobile computing device is at a first location, and the step of playing a second data file on the mobile computing device when the mobile computing device is at a second location. A media file locally stored on the mobile computing device is automatically played after the playback of the first data file and before the playback of the second data file. The user is provided with an option to make a donation to an organization associated with the first location when the mobile computing device is at the first location.

20 Claims, 16 Drawing Sheets

(56) References Cited

U.S. PATENT DOCUMENTS

| | | |
|---|---|---|
| 8,428,614 B2 * | 4/2013 | Wolfe .................... 455/456.1 |
| 8,467,954 B2 | 6/2013 | Kobuya et al. |
| 8,468,469 B1 | 6/2013 | Mendis et al. |
| 8,473,421 B2 | 6/2013 | Scalisi |
| 8,489,111 B2 | 7/2013 | Chawla |
| 8,489,331 B2 | 7/2013 | Kopf et al. |
| 8,498,814 B2 | 7/2013 | Irish et al. |
| 8,503,993 B2 | 8/2013 | Li |
| 8,504,450 B2 | 8/2013 | Shastry |
| 8,515,674 B2 | 8/2013 | Babetski |
| 8,515,870 B2 | 8/2013 | Oskolkov et al. |
| 8,526,971 B2 | 9/2013 | Giniger et al. |
| 8,538,442 B1 | 9/2013 | Ettinger et al. |
| 8,539,380 B2 | 9/2013 | Krumm et al. |
| 8,542,097 B2 | 9/2013 | Ross et al. |
| 8,543,509 B1 | 9/2013 | Gundy |
| 8,554,679 B1 | 10/2013 | Gundy |
| 8,571,514 B2 | 10/2013 | Andreasson |
| 8,589,236 B2 | 11/2013 | Afana |
| RE44,645 E | 12/2013 | Teasley |
| 8,600,667 B2 | 12/2013 | Ranford |
| 8,612,512 B1 | 12/2013 | Croak et al. |
| 8,635,017 B2 | 1/2014 | Geelen et al. |
| 8,638,214 B2 | 1/2014 | Kummetz |
| 8,639,767 B1 | 1/2014 | Harris et al. |
| 8,649,976 B2 | 2/2014 | Kreft |
| 8,655,673 B2 | 2/2014 | Zhang |
| 8,655,873 B2 | 2/2014 | Mitchell et al. |
| 8,662,384 B2 | 3/2014 | Dodin |
| 8,680,985 B2 | 3/2014 | Brady, Jr. et al. |
| 8,694,380 B2 | 4/2014 | Fisher |
| 8,700,320 B1 | 4/2014 | Teicher |
| 8,719,198 B2 | 5/2014 | Zheng et al. |
| 8,725,120 B2 | 5/2014 | Glorikian |
| 8,744,236 B2 | 6/2014 | Hessels |
| 2008/0109761 A1 | 5/2008 | Stambaugh |
| 2009/0005983 A1 * | 1/2009 | Mardell .................... 701/213 |
| 2009/0143977 A1 | 6/2009 | Beletski et al. |
| 2009/0163182 A1 * | 6/2009 | Gatti et al. ................ 455/414.1 |
| 2009/0271289 A1 * | 10/2009 | Klinger et al. ................ 705/26 |
| 2010/0257234 A1 | 10/2010 | Caughey |
| 2011/0083101 A1 * | 4/2011 | Sharon et al. ................ 715/800 |
| 2011/0130959 A1 | 6/2011 | Hwang |
| 2012/0036467 A1 * | 2/2012 | Tom et al. .................... 715/772 |
| 2012/0041990 A1 | 2/2012 | Kreindlina et al. |
| 2012/0295632 A1 | 11/2012 | Karlsson et al. |
| 2013/0006521 A1 | 1/2013 | Needham et al. |
| 2013/0203445 A1 | 8/2013 | Grainger et al. |
| 2013/0246296 A1 | 9/2013 | Sierra |
| 2013/0257906 A1 | 10/2013 | Tang et al. |
| 2013/0310081 A1 | 11/2013 | Chu |
| 2014/0039792 A1 | 2/2014 | Seetharam |
| 2014/0149152 A1 | 5/2014 | Nickolson |

* cited by examiner

SYSTEMS AND METHODS FOR CREATING AND PROVIDING LOCATION-BASED CONTENT

CROSS-REFERENCE TO RELATED APPLICATIONS

This application claims priority as a continuation to U.S. patent application Ser. No. 14/470,778, filed Aug. 27, 2014 and titled "Systems and Methods for Creating and Providing Location-Based Content" which is a continuation to U.S. patent application Ser. No. 14/327,256, filed Jul. 9, 2014 and titled "Systems and Methods for Creating and Providing Location-Based Content" which claims priority to U.S. Provisional Patent Application No. 61/844,332 filed Jul. 9, 2013, the entire contents of which are incorporated herein by reference.

FIELD OF THE INVENTION

The present invention is directed generally to the creation and dissemination of content based on the location and context of a user. More specifically, the present invention is directed to systems and methods for providing customized guided tours to users via the users' mobile devices.

SUMMARY

Systems and methods for providing guided tours to users via their respective computing devices are disclosed herein. According to one embodiment, a communications system comprises a content providing device. The content providing device has a first processor in data communication with a first input device, a first output device, a first networking device, and a first non-transitory computer memory having a first program. The communications system further comprises a user computing device having a second processor in data communication with a second input device, a second output device, a second networking device, a global positioning system, a short messaging service component, and a second non-transitory computer memory having a second program and a media file. The first non-transitory computer memory includes a first data file associated with a first location and a second data file associated with a second location. The first program and the second program collectively include instructions for causing the content providing device to transmit the first data file to the user computing device when the user computing device is proximate the first location, and also include instructions for causing the content providing device to transmit the second data file to the user computing device when the user computing device is proximate the second location. The second program includes instructions for allowing a user of the user computing device to make a donation to an organization associated with the first location when the user computing device is at the first location. The second program further includes instructions for automatically causing playback of the media file on the second output device after the first data file has been played on the second output device and before the second data file is played on the second output device.

A software product comprising instructions is disclosed according to another embodiment. The instructions are stored on non-transitory computer-readable media, and when executed by a computer, perform steps for providing a guided tour to a user via a mobile computing device. The steps include the step of playing a first data file on the mobile computing device when the mobile computing device is at a first location, and the step of playing a second data file on the mobile computing device when the mobile computing device is at a second location. A media file locally stored on the mobile computing device is automatically played after the playback of the first data file and before the playback of the second data file. The user is provided with an option to make a donation to an organization associated with the first location when the mobile computing device is at the first location.

According to yet another embodiment, a communications system comprises a content providing device. The content providing device has a first processor in data communication with a first input device, a first output device, a first networking device, and a first non-transitory computer memory having a first program. The communications system further comprises a user computing device having a second processor in data communication with a second input device, a second output device, a second networking device, a global positioning system, a short messaging service component, and a second non-transitory computer memory having a second program and a media file. The first non-transitory computer memory includes a first data file geo-tagged to a first location and a second data file geo-tagged to a second location. The first program and the second program collectively include instructions for causing the content providing device to transmit the first data file to the user computing device when the user computing device is proximate the first location, and also include instructions for causing the content providing device to transmit the second data file to the user computing device when the user computing device is proximate the second location. The second program includes instructions for allowing a user of the user computing device to make a donation to an organization associated with the first location when the user computing device is at the first location. The second program further includes instructions for setting an accuracy threshold and a recency threshold based on a mode of travel of the user.

BRIEF DESCRIPTION OF THE DRAWINGS

Illustrative embodiments of the present invention are described in detail below with reference to the attached drawing figures and wherein.

DETAILED DESCRIPTION

The tourism industry, according to the World Tourism Organization, has experienced continued growth over the past several years, and is now one of the fastest growing economic sectors in the world. People worldwide, in increasing numbers, are traveling both domestically and internationally to explore and experience different destinations. Travel guidebooks, which help orient the tourists and aim to enhance their explorative excursions, therefore, are also becoming increasingly prevalent.

Travel guidebooks are now available in electronic form (e.g. as a digital book), which a user may download or stream on a computing device (e.g., a laptop or a cell phone). Generally, however, such digital guidebooks do not take into account the exact location of the user. Thus, the user may only obtain additional information about his locale using the digital guidebook if he knows what his current location is, which is often not the case. Further, digital guidebooks do not take into account a specific user's intended path of travel and force the user to tailor his travel according to the information in the guidebook, which too is undesirable.

Some travelers may retain personal tour guides to accompany them on their travels. A tour guide, however, may not be familiar with all the various places that a traveler wishes to explore, and may be unavailable to accompany the traveler for the entire duration of his visit. Further, for many travelers, this option may be prohibitively expensive.

There is thus a need for robust systems and methods that are easily accessible to the masses and which provide guided tours to tourists based on their current location, path of travel, and individualized preferences. The present invention is generally directed to such systems and methods.

Figure 1:
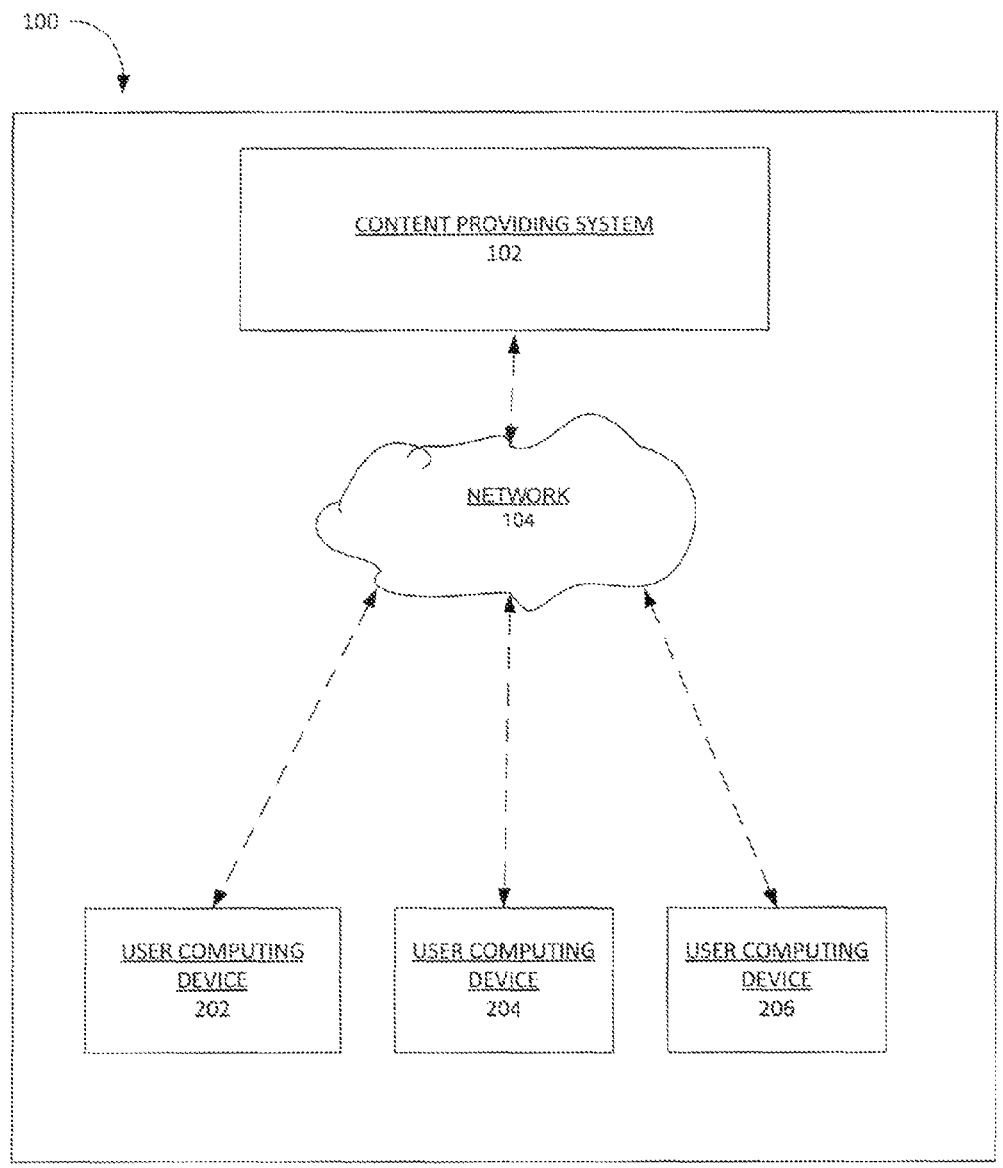
FIG. 1 shows a schematic illustrating electronic communication between various components of a communications system for providing location-based content to users, according to an embodiment.

Attention is directed now to FIG. 1, which shows a system 100 for providing location-based content to one or more users according to an embodiment of the present invention. The system 100, which may also be referred to herein as the communications system 100, may comprise a content providing system (or device) 102. The communications system 100 may further comprise one or more user computing devices, such as the user computing devices 202, 204, and 206. The user computing devices 202, 204, and 206 may be in data communication with the content providing system 102. For example, the user computing devices 202, 204, and 206 may be in data communication with the content providing system 102 over a network 104, as discussed in more detail below.

Figure 2:
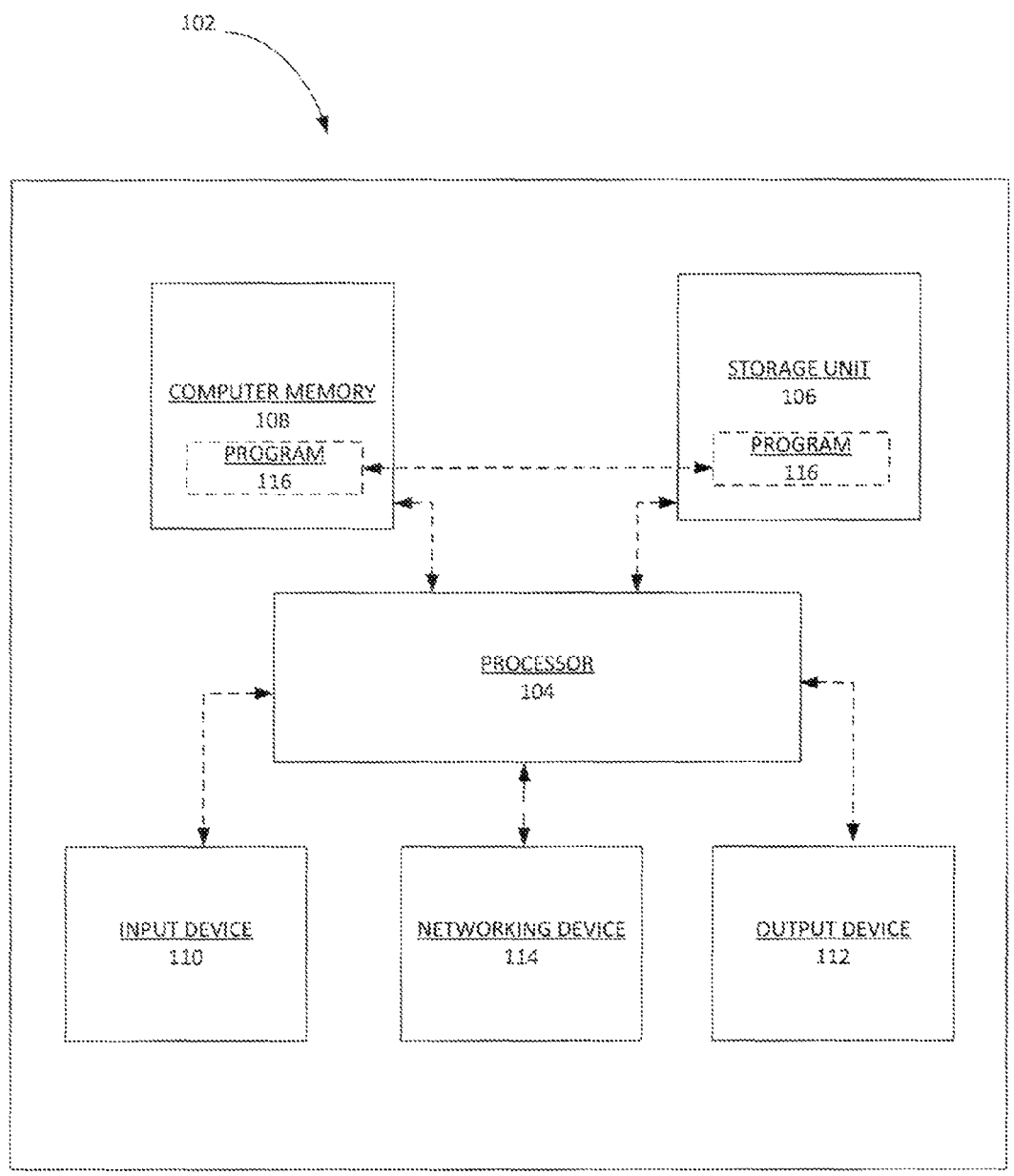
FIG. 2 shows a schematic illustrating electronic communication between various components of a content providing system of the communication system of FIG. 1.

Focus is directed now to FIG. 2, which shows the content providing system 102 in more detail. The content providing system 102 may comprise a processor 104. The processor 104 may be any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. The content providing device 102 may also include a storage unit 106, a computer memory 108, an input device 110, an output device 112, and a networking device 114, each of which may be in data communication with the processor 104.

The storage unit 106 may be, for example, a disk drive that stores programs and data, and the storage unit 104 is illustratively shown storing a program (or application) 116 embodying the steps and methods set forth below. It should be understood that the program 116 could be broken into subprograms and stored in storage units of separate devices and that data could be transferred between those storage units using methods known in the art. A dashed outline within the computer memory 108 represents the software program 116 loaded into the computer memory 108 and a dashed line between the storage unit 106 and the computer memory 108 illustrates the transfer of the program 116 between the storage unit 106 and the computer memory 108.

The input device 110 may comprise one or more keys, switches, knobs, sensors, remote controllers, microphones, stylus pens, cameras, receivers (e.g., RFID or Bluetooth receivers), inputs slots for CD, DVD, VHS, USB, SD cards, et cetera. In the preferred embodiment, the input device 110 may include at least a wired or wireless keyboard and a mouse. The output device 112 may comprise one or more display screens (e.g., CRT, LCD, Plasma, et cetera), speakers, transmitters (e.g., RFID or Bluetooth emitters), or any other appropriate visual or audio output devices whether now known or later invented. In some embodiments, the functionality of the input and output devices 110, 112 may be combined into a solitary device (e.g., a touch screen, a transceiver, et cetera). The networking device 114 may be any networking device that allows the content providing system 102 to connect to the network 104, such as a switch, router, modem, networking card, antenna, transceiver, et cetera. The network 104 may be any suitable network that allows for bidirectional communication between the content providing system 102 and the user computing devices 202, 204, and 206, and/or bidirectional communication between the user computing devices 202, 204 and 206. For example, the network 104 may be one or more of a wireless (or wired) wide area network, a local area network, a personal area network, a cellular network (e.g., GSM or CDMA), a Bluetooth network, an Infrared network, the World Wide Web, et cetera.

In some embodiments, the content providing system 102 may comprise a solitary server, computer (e.g., a desktop or laptop computer), or other suitable computing device. In other embodiments, the content providing system 102 may comprise a cluster or collection of servers, computers, or other suitable computing devices. Typically, a cluster or collection of servers may be used when the demands of client devices (e.g., user computing devices 202, 204, and 206) are beyond the reasonable capability of a single server or computer 102. In some embodiments, the servers in the cluster or collection of servers may be interchangeable from the perspective of the client devices 202, 204 and 206.

Figure 3:
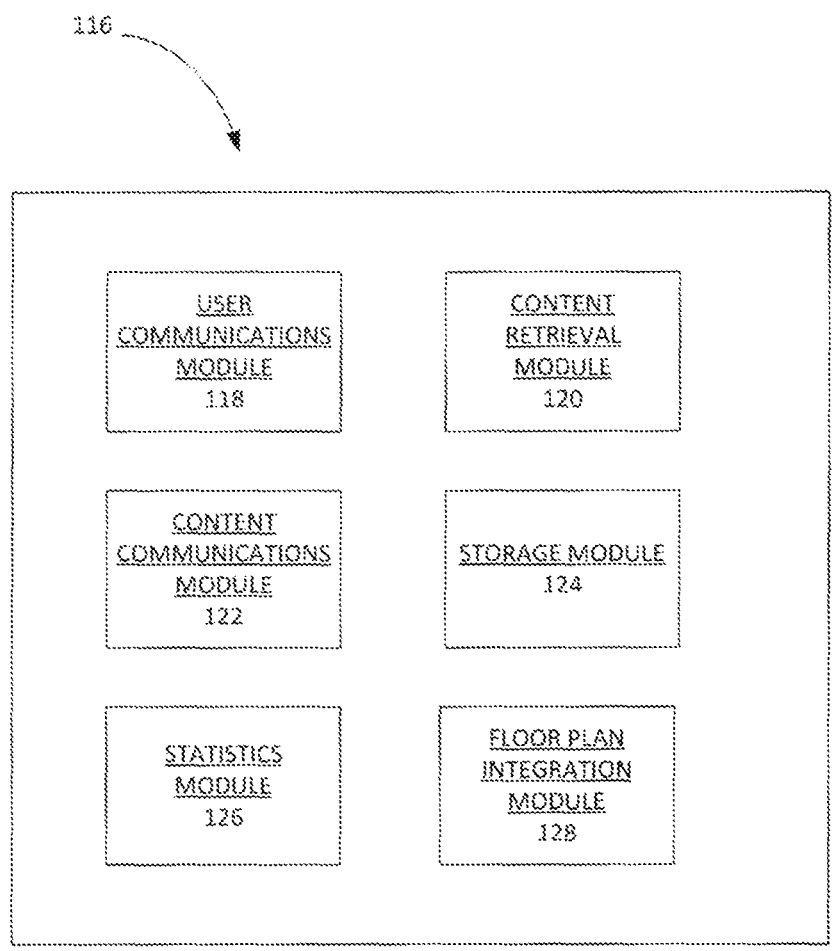
FIG. 3 shows a schematic outlining various modules of a server-side program of the content providing system of FIG. 2.

FIG. 3 is a schematic representation of the program (or server-side application) 116. As can be seen, the server-side application may comprise a user communications module 118, a content retrieval module 120, a content communications module 122, a storage module 124, a statistics module 126, and a floor plan integration module 128, the functionality of each of which is described in more detail below. People of skill in the art will appreciate that in some embodiments, one or more of these modules may be omitted, and that in other embodiments, one module (e.g., the content communications module 122) may encompass the functionality provided by another module (e.g., the content retrieval module 120).

Figure 4:
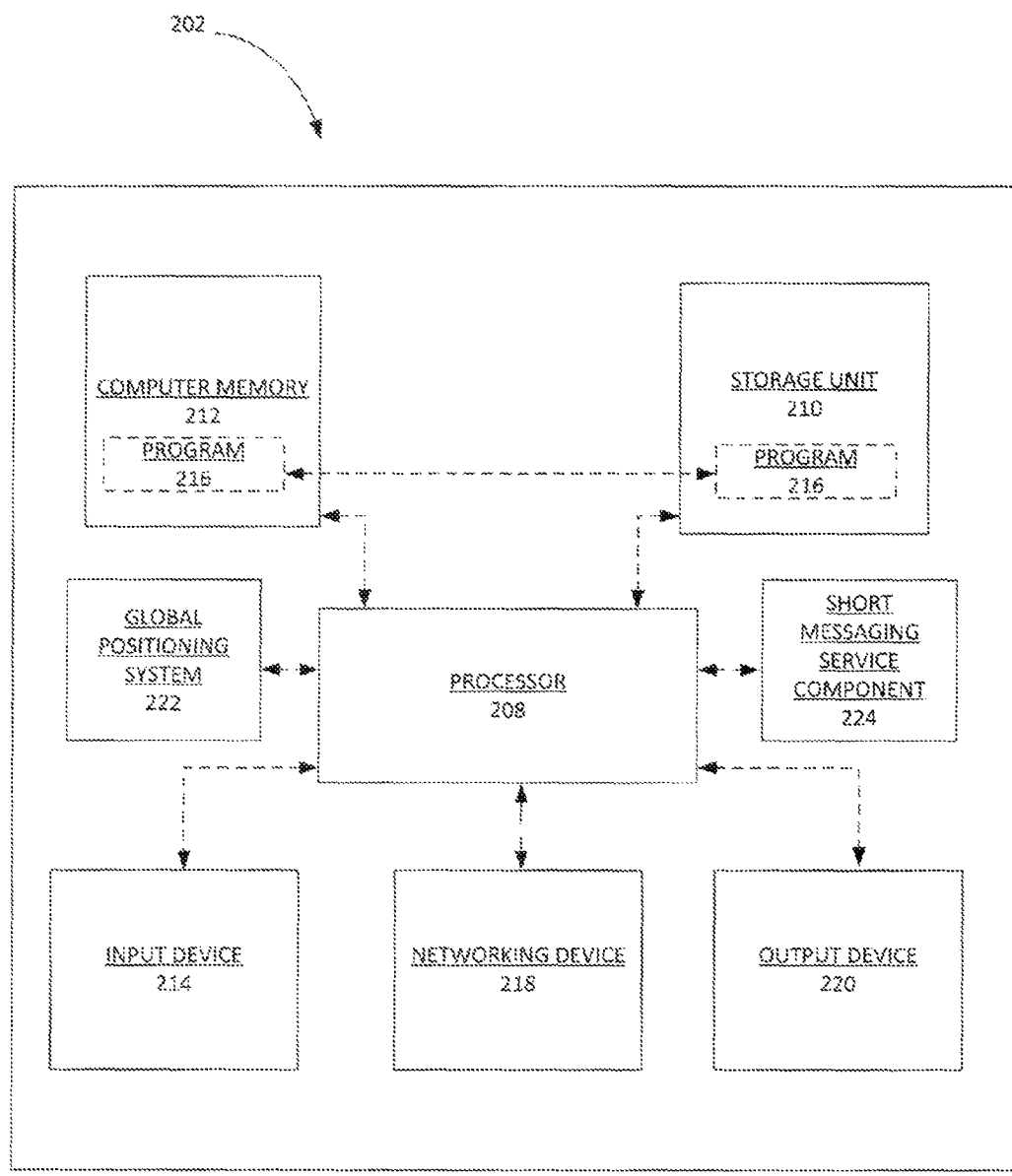
FIG. 4 shows a schematic illustrating electronic communication between various components of a user communication device of the communication system of FIG. 1.

Attention is directed now to FIG. 4, which shows the user computing device 202. The user computing device 202 may comprise a processor (or controller) 208, which may be in data communication with a storage unit 210, a computer memory 212, an input device 214, a networking device 218, an output device 220, a global positioning system ("GPS") 222, and a short messaging service ("SMS") component 224. Schematically, the user computing devices 204 and 206 (see FIG. 1) may be generally identical to the user computing device 202 shown in FIG. 4; that is, each of the user computing devices 204 and 206 may similarly include a processor that is in data communication with a storage unit, a computer memory, an input device, a networking device, an output device, a global positioning system, and a short messaging service component.

The storage unit 210 may be, for example, a disk drive that stores programs and data, and the storage unit 210 is illustratively shown storing a program (or client-side application or local content application) 216 embodying the steps and methods set forth below. The program 216 may in some embodiments operate in conjunction with the program 116 of the content providing system 102. It will be understood that the program 216 could be broken into subprograms and stored in storage units of separate devices and that data could be transferred between those storage units using methods known in the art. A dashed outline within the computer memory 212 represents the software program 216 loaded into the computer memory 212 and a dashed line between the storage unit 210 and the computer memory 212 illustrates the transfer of the program 216 between the storage unit 210 and the computer memory 212.

The input device 214, akin to the input device 110 of the content providing system 102, may comprise one or more keys, switches, knobs, sensors, remote controllers, microphones, stylus pens, cameras, receivers (e.g., RFID or Bluetooth receivers), input slots for CD, DVD, VHS, USB, SD cards, et cetera. The output device 220 may comprise one or more display screens (e.g., CRT, LCD, Plasma, et cetera), speakers, transmitters (e.g., RFID or Bluetooth emitters), or any other appropriate visual or audio output devices whether now known or later invented. In some embodiments, the functionality of the input and output devices 214, 220 may be combined into a solitary device (e.g., a touch screen, a transceiver, et cetera). The networking device 218 may be any networking device that allows the user computing device 202 to connect to the network 104, such as a switch, a router, a modem, a networking card, an antenna, a transceiver, et cetera. The GPS 222, as is known, may utilize a network of satellites orbiting the earth to ascertain the location of the user computing device 202. The SMS component 224 may allow the user of the user computing device 202 to send and receive text messages.

In the preferred embodiment, the user computing device 202 may be a mobile device, such as a laptop (e.g., an Apple® Macbook, Dell® Ultrabook, HP® Envy, Sony® Vaio), a tablet (e.g., Apple® iPad, Samsung® Chromebook, Dell® Venue, Microsoft® Surface Pro, Google® Nexus), a smart phone (e.g., Apple® iPhone, BlackBerry® Bold, LG® G2, Samsung® Galaxy), et cetera. For example, in one embodiment, the user computing device 202 may be a laptop, the user computing device 204 may be a tablet, and the user computing device 206 may be a smart phone. In another embodiment, similarly, the user computing device 202 may be a tablet whereas the user computing devices 204 and 206 may be smart phones. Although certain mobile devices are identified herein by name, those skilled in the art will appreciate that any suitable mobile device, whether now known or later developed, may be utilized in the system 100.

While FIG. 1 shows three user computing devices 202, 204, and 206, it will be appreciated that this configuration is exemplary only and that many (e.g., tens, hundreds, thousands, et cetera) user computing devices may similarly be in data communication with the content providing system 102 at one time. Further, although not expressly detailed in the figures, those skilled in the art will also readily appreciate that each of the user computing devices 202, 204, and 206 (and the content providing system 102) may include an operating system (e.g., Microsoft® Windows, Mac® OS, UNIX® OS, Linux® OS, Palm® OS, the Android OS, and the Symbian OS) that controls basic tasks such as the control and allocation of memory, facilitation of networking, file management, prioritization of processes, et cetera.

Figure 5:
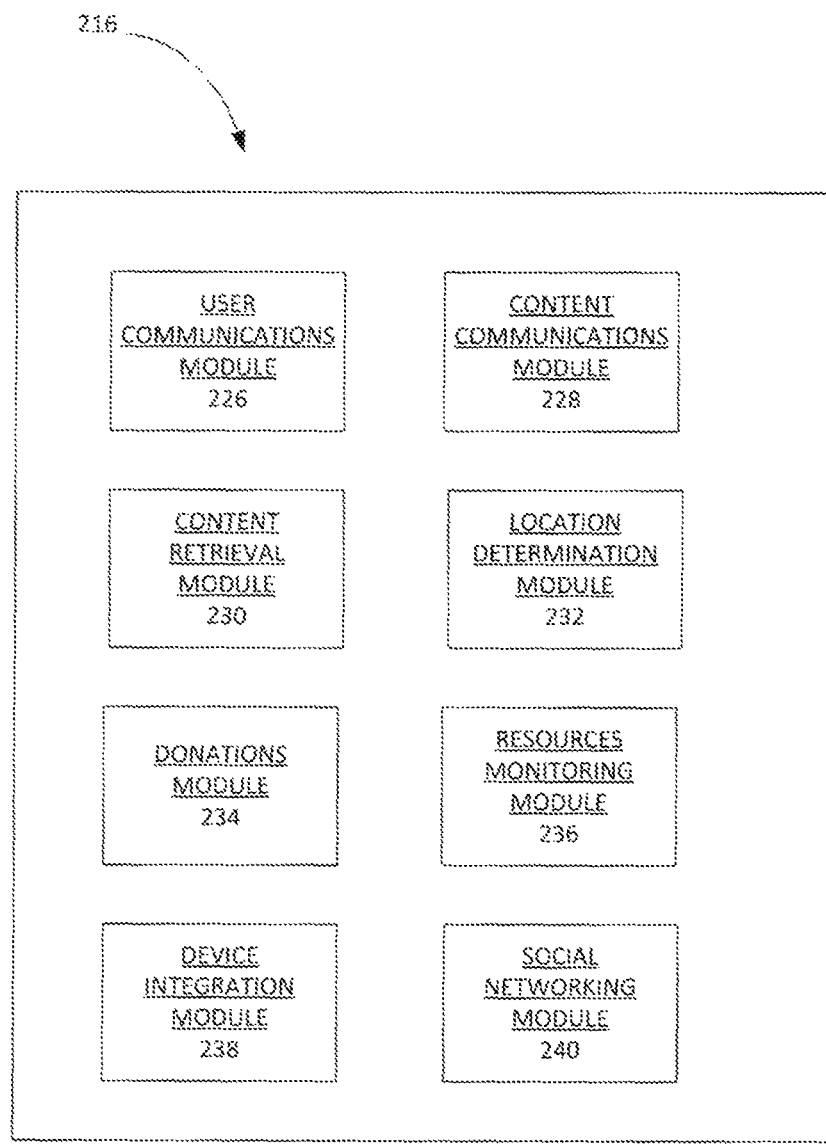
FIG. 5 shows a schematic outlining various modules of a client-side program of the user communication device of FIG. 4.

Focus is directed now to FIG. 5, which is a schematic representation of the program (or client side application or user computing device application) 216 of the user computing devices 202, 204, and 206. As can be seen, the program 216 may comprise a variety of modules, including a user communications module 226, a content communications module 228, a content retrieval module 230, a location determination module 232, a donations module 234, a resources monitoring module 236, a device integration module 238, and a social networking module 240. People of skill in the art will appreciate that in some embodiments, one or more of these modules may be omitted, and that in other embodiments, one module (e.g., the content communications module 228) may encompass the functionality provided by another module (e.g., the content retrieval module 230).

Figure 6:
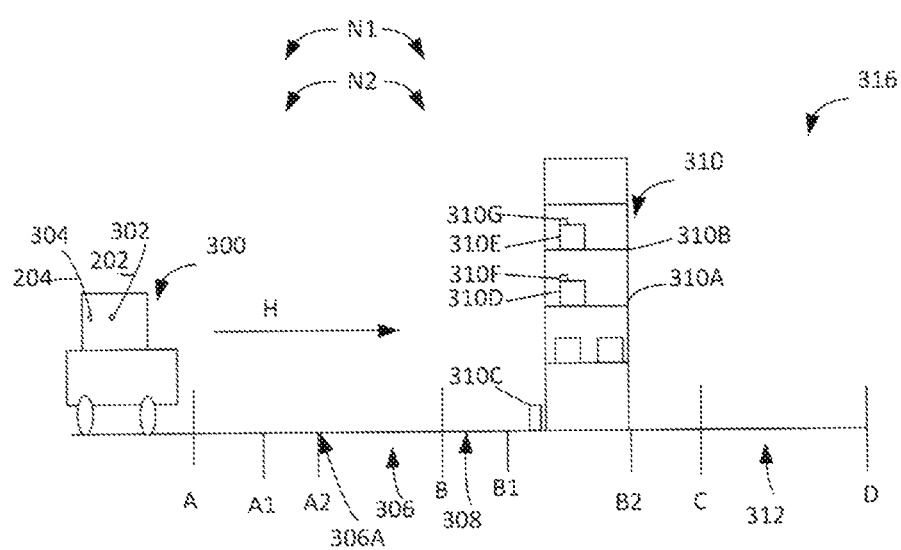
FIG. 6 schematically illustrates a tour being taken by users of the user communication device of FIG. 4.

The workings of the system 100 for providing location-based content will now be described with a non-limiting example. Assume, with reference to FIG. 6, that: (1) users 302 and 304, having user computing devices 202 and 204, respectively, are traveling in a vehicle 300 in a direction H from a point A to a point D; (2) the user computing device 202 is a smart phone utilizing a network N1 (e.g., ATT® or another cellular network) and the user computing device 204 is a smart phone utilizing a network N2 (e.g., Sprint® or another cellular network); (3) the user 302 is an adult whereas the user 304 is a child; (4) the area between points A and B represents a celebrated national park 306, and point A2 represents a famous lake 306A within the park 306; (4) the area between points B and C represents a historic district 308 and the area between points B1 and B2 includes a building (e.g., a museum) 310 that showcases memorabilia from this historic district 308; (5) the area 312 between points C and D is represents a Civil War battlefield; and (6) in the area between points A and C, both networks N1 and N2 provide both voice and data coverage, whereas in the area between points C and D, network N1 provides both voice and data coverage while the network N2 provides only intermittent voice coverage.

Figure 7A:
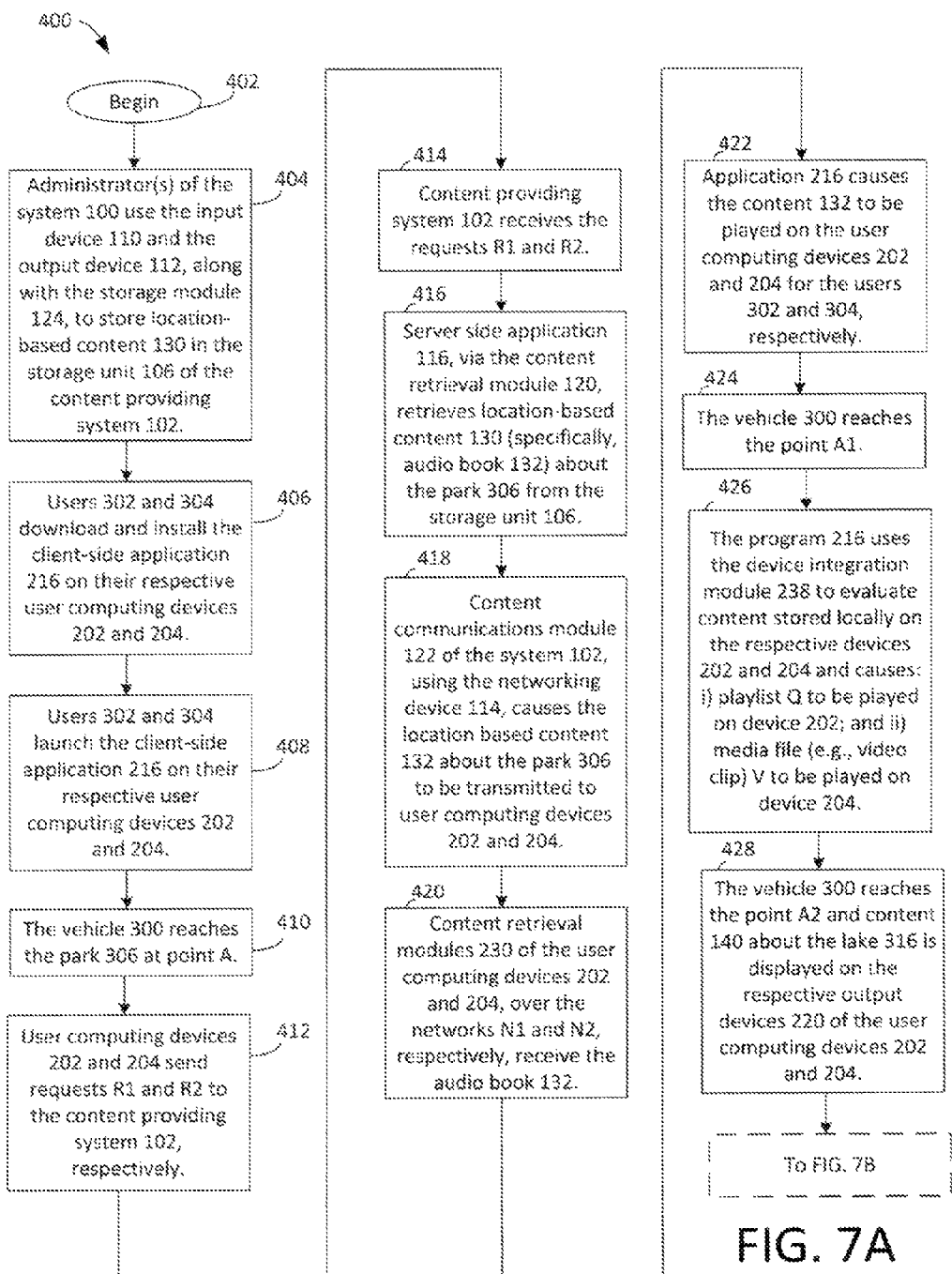
FIGS. 7A-7B show a flowchart outlining various steps of a method of using the communications system of FIG. 1, according to an embodiment.
Figure 7B:
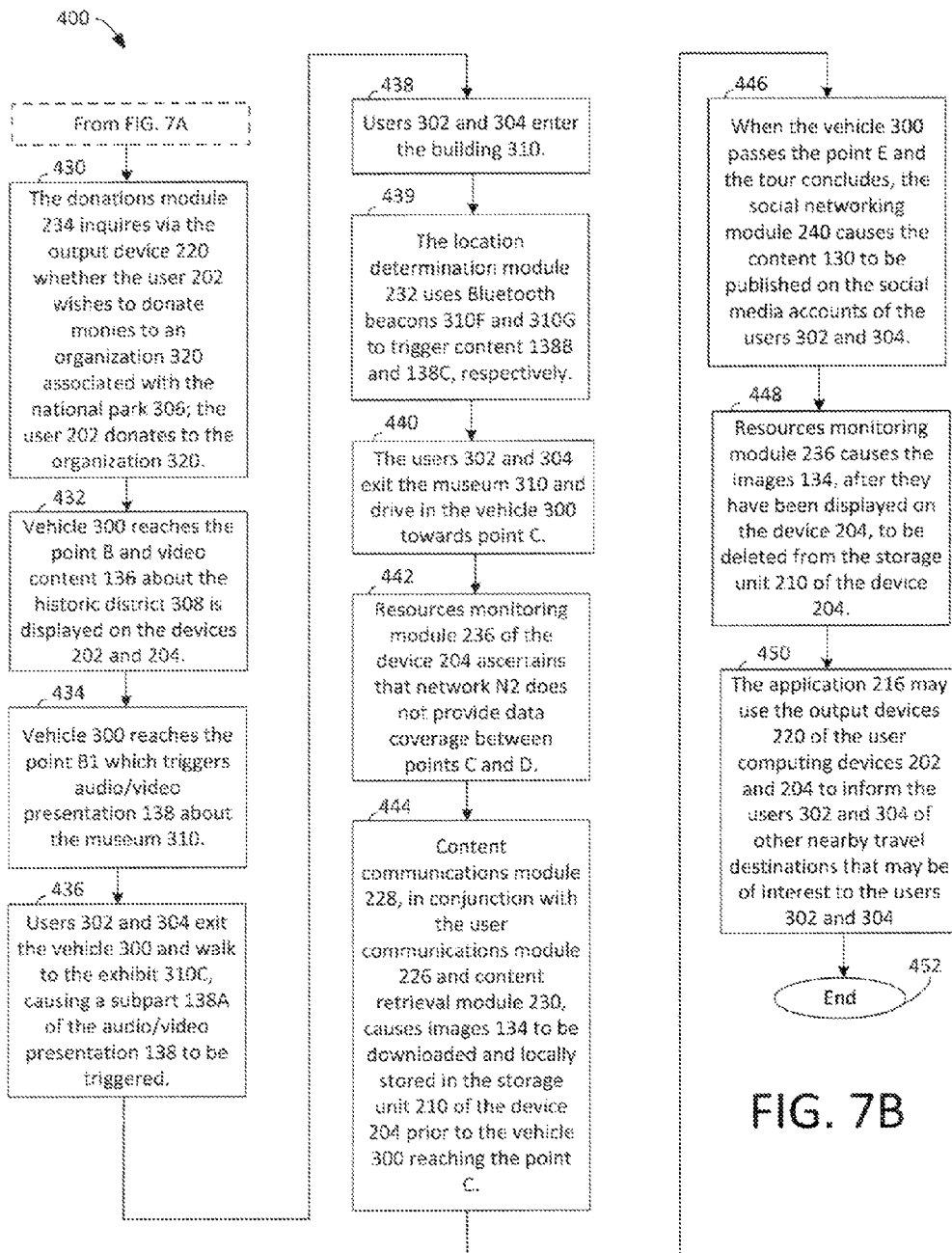

FIG. 7 illustrates a method 400 detailing the use of the system 100 by the users 302 and 304. Those skilled in the art will appreciate that the method 400 is merely exemplary. The method 400 may be employed in many different embodiments or examples not specifically depicted or described herein. In some embodiments, the method steps of the method 400 may be performed in the order presented. In other embodiments, steps of the method 400 may be performed in a different suitable order. In other embodiments still, one or more of the steps of the method 400 may be combined with other steps, or omitted entirely.

The method 400 may begin at step 402, and at step 404, an administrator of (or another entity affiliated with) the system 100 may use the input device 110 and the output device 112 of the content providing system 102, along with the storage module 124 of the program (or server-side application) 116, to store location-based content 130 in the storage unit 106. The location-based content 130 may include a variety of information about many thousands of popular destinations worldwide; for instance, the location-based content 130, in this example, may include information about the national park 306, the lake 306A, the historic district 308, the museum 310, and the battlefield 312 (collectively, exemplary destinations 316).

Figure 8:
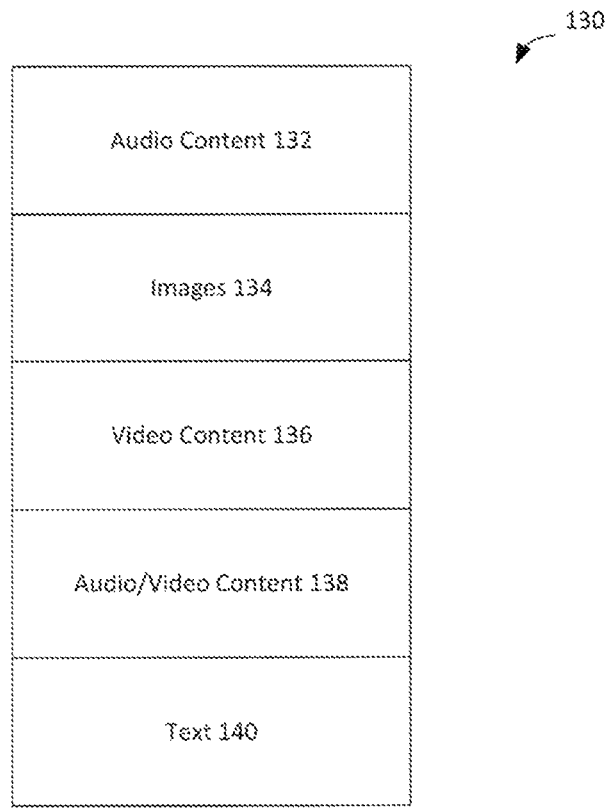
FIG. 8 is a schematic outlining different types of content that may be disseminated from the content providing system of FIG. 2 to the user computing device of FIG. 4.

The location-based content 130 may be any type of content that relates directly or indirectly to the exemplary destinations 316 and which may enhance the experience of the users 302, 304 as they visit them. For example, the location-based content 130 may include audio content 132 (e.g., a short audio book about the national park 306 and its significance), images 134 (e.g., images of paintings depicting the battlefield 312), video content 136 (e.g., a silent video about the historic district 308), audio/video content 138 (e.g., an audio/video presentation or movie about the museum 310 and the exhibits therein), text 140 (e.g., an article about the lake 306A), et cetera (see FIG. 8). In many cases, the location-based content 130 may be primarily informative; however, the location-based content 130 may also take other forms (e.g., be primarily comedic, conspiratorial, entertaining, et cetera). In some embodiments, the location-based content 130 may be configured to provide information about the exemplary destinations 316 in an informal way (e.g., in the form of a story).

The location-based content 130 may be geo-tagged using methods known in the art. For example, the audio book 132 about the national park 306 may be geo-tagged to the point A, the article 140 about the lake 306A in the park 306 may be geo-tagged to the point A2, the silent video 136 about the historic district 308 may be geo-tagged to the point B, the audio/video presentation 138 about the museum 310 may be geo-tagged to the point B1, and the images 134 of the battlefield 312 may be geo-tagged to the point C, as discussed in more detail below.

The step 404 may be performed by the administrator(s) remotely (e.g., over the network 104) or locally. Remote capability may allow the location-based content 130 to be continually updated as required and improved with ease. In some embodiments, more than one administrator may compile the location-based content 130 in the content providing system 102. In other embodiments, some or all of the location-based content 130 may be populated using "internet scraping" or "crowd sourcing." In other embodiments still, users (e.g., users 302 and 304) may be allowed to compile some or all of the content 130, or may be allowed to provide feedback (e.g., via the computing device 202 and 204) which the administrator may take into account when updating the content 130. Those skilled in the art will appreciate that in many embodiments, a large amount of time (e.g., days, months, et cetera) may pass after step 404 is executed and before the remaining steps in the method 400 are performed.

At step 406, the users 302 and 304 may download and install the application (or program) 216 on their respective user computing devices 202 and 204. This step 406 may be performed at any time before the users 302 and 304 reach the point A. For example, the users 302 and 304 may have downloaded and installed the application 216 on their respectively user computing devices 202 and 204 before they began the instant trip (e.g., at home via the Apple® App store or the Google® Play store). In some embodiments, the users 302 and 304 may be required to pay a fee to utilize the application 216. In other embodiments, however, the application 216 may be utilized by the users 302 and 304 free of charge, and administrators of the system 100 may generate revenues from the application 216 using traditional methods, such as via sponsors, donations, in-app purchases of additional content by the users, et cetera.

Figure 9:
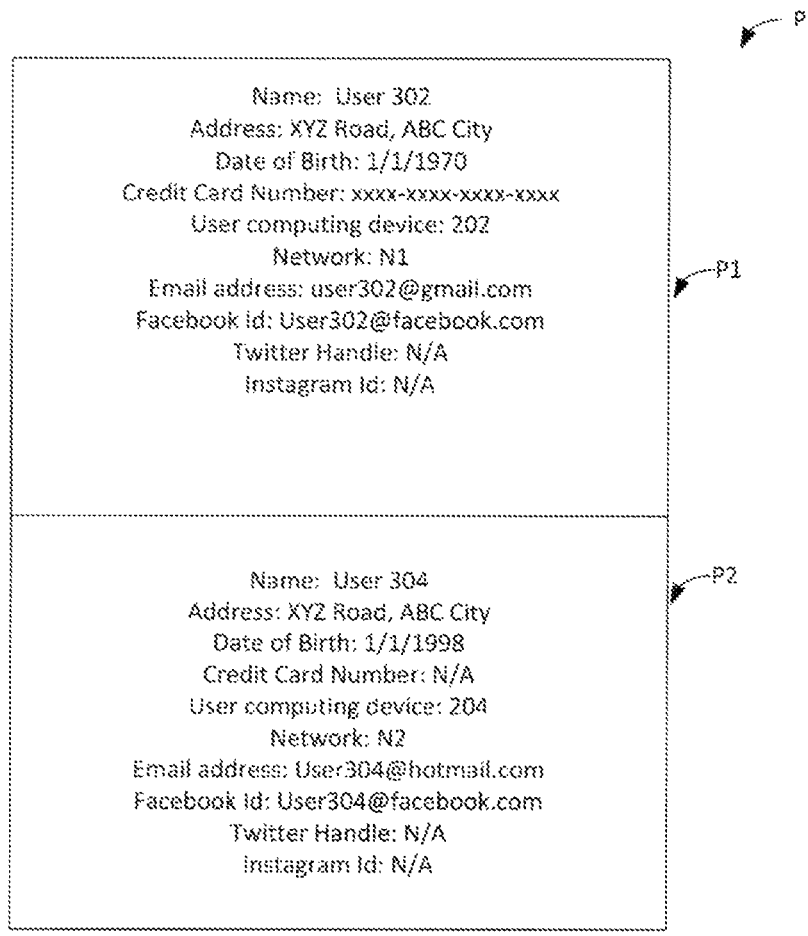
FIG. 9 is a schematic illustrating various fields in a profile of the users of the user communication device of FIG. 4.

In some embodiments, the users 302 and 304 may be required to create a unique profile P during the installation process. For example, the user 302 may be required to create a profile P1 (see FIG. 9) and the user 304 may be required to create a profile P2 in order to use the application 216. The profiles P1 and P2 may have various fields outlining information about the users 302 and 304, respectively. For example, the profile P1 may include the name of the user 302, his mailing address, date of birth, e-mail address, credit card number, name of the user computing device 202, the network associated with the user computing device 202, Facebook® and Instagram® Ids, Twitter® handle, et cetera. The profile P2 of the user 304 may include similar information about the user 304. The profiles P of the users 302 and 304 (and of other users) may be stored in the storage unit 106 of the content providing system 102, on an external drive in communication with the content providing system 102, on the Cloud, et cetera. It will be appreciated that in some embodiments, the profile P may include additional fields not expressly identified herein, and that in other embodiments, some of the fields may be omitted. In other embodiments still, the creation of the profile P may not be a pre-requisite to using the program 216.

At step 408, the users 302 and 304 may launch the application 216 on their user computing devices 202 and 204, respectively. At step 410, the vehicle 300 may reach the point A. At step 412, as the vehicle 300 reaches the point A, the user computing device 202, via its user communications module 226 and the networking device 218, may send a request R1 to the content providing system 102. Similarly, the user computing device 204, via its user communication module 226 and the networking device 218, may send a request R2 to the content providing system 102. The requests R1 and R2 may include information about the current location of the user computing devices 202 and 204, as determined by the global positioning system 222 of the devices 202, 204 and/or the location determination module 232 of the application 216.

The location determination module 232 may be robust and may determine the location of the user computing devices 202 and 204 in one of any number of ways. For example, in some embodiments, the location determination module 232 may query the GPS 222 to determine the current location of the devices 202 and 204. In other embodiments, the location determination module 232 may additionally comprise a Wi-Fi based positioning system (WPS) that may, for example, use network localization techniques to determine the location of the user. In other embodiments still, the location determination module 232 may use cell tower triangulation, Bluetooth, or another suitable method to ascertain the location of the devices 202 and 204. The location determination module 232, in some embodiments, may also conduct redundancy checks (e.g., verify the location as determined by the GPS 222 using cell tower triangulation) to ensure that the location of the devices 202 and 204 has been accurately determined. In some embodiments, the users 302 and 304 may be allowed to manually convey their location to the location determination module 232 (e.g., using the input device 214 and the output device 220).

At step 414, the user communication module 118 of the content providing system 102 may receive the requests R1 and R2. At step 416, the program 116 may utilize the content retrieval module 120 to retrieve the location-based content 130 about the national park 306 from the storage unit 106. At step 418, the content communications module 122 of the content providing system 102, in conjunction with the networking device 114, may cause the location-based content 130 (e.g., the audio book 132 about the park 306) to be transmitted to the user computing devices 202 and 204.

At step 420, the content retrieval modules 230 of the user computing devices 202 and 204, over the networks N1 and N2, respectively, may receive the audio book 132. At step 422, application 216 may cause the content 132 to be streamed on the user computing devices 202 and 204 for the users 302 and 304, respectively. The duration of the audio book 132 may be configured so as to ensure that the playback of the audio book 132 concludes before the vehicle 300 reaches the point A2 (e.g., when it reaches a point A1).

At step 424, as the playback of the audio book 132 concludes, the vehicle 300 may reach the point A1. The program 216 may determine that the vehicle 300 is yet to reach the point A2 (to which point the content 140 is tagged), and that the vehicle 300 is expected to reach the point A2 in a certain amount of time (e.g., ten minutes). The program 216 may determine the expected time of arrival of the vehicle 300 at point A2 via one of a number of ways. For example, the program 216 may compute the average speed of the vehicle 300 since it traversed the point A and use this average speed to determine that the vehicle 300 is likely to reach the point A2 in ten minutes. Alternatively, the statistics module 126 of the program 126, which may comprise information about other vehicles that have traveled from point A to point B in the past, estimate the time in which the vehicle 300 will reach the point A2. In other embodiments still, this determination of the estimated time of arrival of the vehicle 300 at the point A2 may be omitted.

At step 426, the program 216 may use the device integration module 238 to sift through and evaluate content stored locally on the respective devices 202 and 204 and may cause the same to be displayed (or played) on the user computing devices 202 and 204. For example, the program 216, recognizing that the audio book 132 has concluded and that the vehicle 300 is yet to reach the point A2 where the next geo-tagged content (i.e., the text 140 tagged to the lake 306A at point A2) is due to be played, may play on the user computing device 202 songs from a playlist Q that the user 302 had saved locally on his device 202. Similarly, for example, the program 216 may cause a video clip (or any other media file) V stored locally on the user computing device 204 to be displayed on the user computing device 204 for the user 304 to enjoy. In this way, the users 302 and 304 may seamlessly enjoy personalized content during intervals between the triggering of sequential location-based content 130, which may enhance their experience and ensure that the users 302 and 304 remain continually immersed and engaged during the tour. Those skilled in the art will appreciate that playback by the device integration module 238 of content locally saved on the respective devices 202 and 204 may be preferable to filling the gaps between the triggering of the location-based content 130 with generic content. Of course, in some embodiments (e.g., where the user computing devices 202, 204 do not have suitable content that is stored locally), the interludes between the triggering of sequential location-based content 130 may be filled with generic content (e.g., popular music, news stories, a radio channel, et cetera). In other embodiments still, the users 302 and 304 may be allowed to select the locally stored content that they desire to play on their respective user computing devices 202 and 204 during the interludes.

At step 428, the vehicle 300 may reach the point A2, and in line with the disclosure above, the content 140 about the lake 316 may be displayed on the respective output devices 220 of the user computing devices 202 and 204. More specifically, the user communication modules 226 of the devices 202 and 204 may respectively send a request R3 and R4 to the content providing system 102. The content retrieval module 120 of the server-side program 116 may retrieve the content 140 from the storage unit 106, and the content communication module 122, in conjunction with the networking device 114, may cause the content 140 to be transmitted to the user computing devices 202 and 204. The application 216, using the respective content retrieval modules 230 and networks N1 and N2 of the devices 202 and 204, may retrieve the content 140 and cause the same to be displayed on the respective output devices 220 of the user computing devices 202 and 204.

In some embodiments, the location-based content (e.g., content 140) transmitted to the user computing device 202 as the vehicle 300 reaches the point A2 may be different from the location-based content transmitted to the user computing device 204. For example, if the text 140 includes graphic language, it may be transmitted to the user computing device 202 but not to the user computing device 204 because the user 304 of the device 204, in this example, is not an adult. In such a case, the location-based content transmitted to the user 304 may include games (e.g., crosswords and puzzles), quizzes, trivia, et cetera. Thus, the location-based content 130 communicated by the system 102 to the devices 202 and 204 may vary based on the age of the users 302 and 304. Similarly, for example, the location based content 130 communicated by the system 102 to the devices 202 and 204 may vary based on the preferences of the users 302 and 304, respectively; for example, the user 304 may prefer only audio/visual content, in which case, only audio/visual content may be communicated by the system 102 to the device 204. The users 302 and 304 may be allowed to set (and revise) such preferences when they download the application 216, or anytime thereafter.

At step 430, the program 216 may utilize the donations module 234 to inquire via the output device 220 of the user computing device 202 whether the user 302 wishes to donate monies to an organization 320 associated with the national park 306. The organization 320 may be any organization associated with the national park 306, such as a non-profit organization, a local community foundation, a local or national charity foundation, a religious organization, et cetera, tasked with, for example, maintaining the park 306. As will be understood from the disclosure herein, the user 304 may not be asked to donate to the organization 320 because the user 304, in this example, is not an adult.

Figure 10:
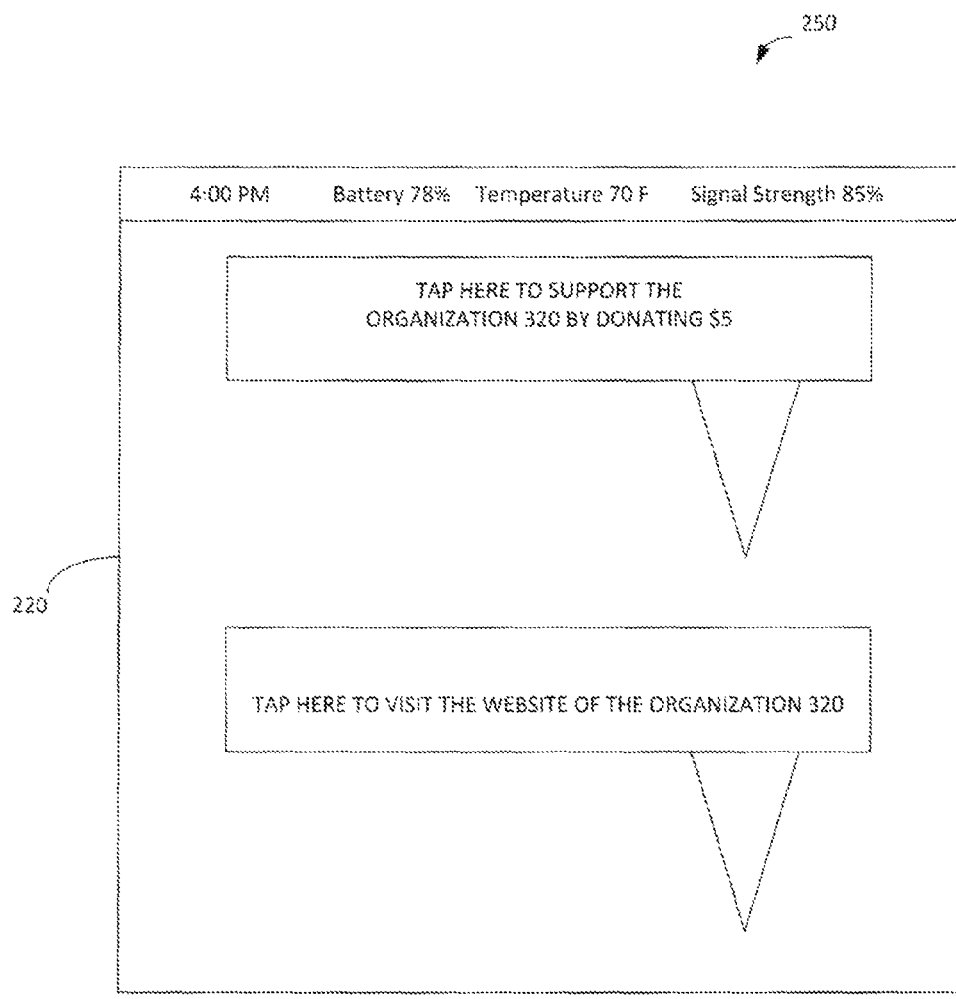
FIG. 10 is a schematic showing an exemplary interface of the client-side program of FIG. 5.

The donations module 234 may solicit the donations in one of a variety of ways. For example, in some embodiments, the donation module 234 may activate the short messaging service component 224 and allow the user 304 to donate monies via simple text message. FIG. 10 shows one exemplary interface 250 of the application 216 as displayed on the output device 220. As can be seen, the user 302 may simply tap the output device (e.g., the screen) 220 to donate $5 (or another amount) to the organization 320 using the short messaging service component 224 activated by the donations module 234. It will be appreciated that the short message may include processing instructions to properly effectuate the donation (e.g., include processing instructions via short code, the amount to be donated, tracking information, et cetera). In other embodiments, the donations module 234 may solicit donations in a different manner. For example, the donations module 234 may direct the user computing device 202 to a website of the organization 320 (or the park 306) and allow the user 302 to donate monies using his credit card, via PayPal®, et cetera.

The ability of the application 216 to collect donations in this non-intrusive fashion via the donations module 234 may be highly beneficial. The user 302 may be inclined to donate at least a modest amount to the organization 320 because of the convenience and because he has just toured the park 306 and feels a connection therewith. However, it will be appreciated that the donations may also be solicited from the user 302 before he reaches the point A (or after he has passed the point B). This functionality of the donations module 234 may provide a consistent stream of revenue for the exemplary locations 316 and aid in their longevity, particularly in high traffic areas.

At step 432, the vehicle 300 may reach the point B, and in line with the disclosure above, the video content 136 (i.e., the silent video about the historic district 308 geo-tagged to the point B) may be displayed on the devices 202 and 204. While not expressly shown in the figures, it will be appreciate that donations to an organization affiliated with the historic district 308 may be solicited from the user 302 at this point (or thereafter).

At step 434, the vehicle 300 may reach the point B1, which may trigger the audio/video presentation 138 about the museum 310. Assume that the museum building 310 has several floors (e.g., floors 310A and 310B, see FIG. 6) and is being used to display several exhibits (e.g., exhibit 310D on the floor 310A and exhibit 310E on the floor 310B). Assume also that an exhibit 310C is being displayed outside the museum building 310. The audio/video presentation 138, thus, may include sub-parts 138A, 138B, and 138C, which may respectively be triggered when the users 302 and 304 are in close proximity to the exhibits 310C, 310D, and 310E.

Assume further that the users 302 and 304 are required to exit the vehicle 300 at the point B1 and travel to the museum 310 on foot. The program 216 may use the location determination module 232 to infer that the users 302 and 304, currently travelling at a relatively slower pace, are now afoot, and seamlessly transition from the driving scale to a walking scale without requiring additional input from the users 302 and 304. Such a seamless transition may ensure that the users 302 and 304 remain continually immersed for the entirety of their guided tour. In some embodiments, however, the users 302 and 304 may be allowed to indicate their mode of travel using the respective input devices 214 of their user computing devices 202 and 204.

At step 436, the users 302 and 304 may walk to the exhibit 310C, which may trigger the sub-part 138A of the audio/video presentation 138. At step 438, the users 302 and 304 may enter the museum building 310.

People of skill in the art appreciate that the functionality of the global positioning system 222 of the devices 202 and 204 may, at least in some instances, be curtailed indoors. Therefore, once the users 302 and 304 are inside the building 310, at step 439, the location determination module 232 may, instead of the GPS 222, determine the location of the users 302 and 304 via other means. For example, Bluetooth beacons 310F and 310G may be located adjacent the exhibits 310D and 310E, respectively, and while the users 302 and 304 are indoors, the program 216 may use these Bluetooth beacons 310F and 310G to trigger the location-based content. That is, at step 439, the program 216 may trigger the sub-part 138B of the audio/video presentation 130 when the users 302 and 304 are on the floor 310A proximate the exhibit 310D, and trigger the sub-part 138C of the audio/video presentation 130 when the users 302 and 304 are proximate the exhibit 310E on the floor 310B. In some embodiments, the application 116 (and/or 216) may use publically available floor plans of the museum 310 (e.g., through standard map kits provided by Apple®, Google®, et cetera) to enhance the triggering of the various sub-parts of the location-based content 138 at the different floors (e.g., floors 310A and 310B).

At step 440, the users 302 and 304 may exit the museum 310 and begin driving towards the point C. As will be appreciated, the program 216 may seamlessly transition from the walking scale it utilized while the users 302 and 304 were in the building 310 to a driving scale.

At step 442, as the users 302 and 304 drive towards the point C and the vehicle 300 is in proximity thereof, the resources monitoring module 236 of the device 204 may ascertain that the network N2 associated with the device 204 does not provide any data coverage between points C and D. For example, the resource monitoring module 236 may refer to a coverage map provided by the administrators of the network N2 to determine that network N2 does not provide data coverage between points C and D. Alternatively, the resource monitoring module 236 may continually or intermittently poll the networks N1 and N2 to determine whether data services (e.g., 3G, 4G, et cetera) are available.

Therefore, at step 444, the content communications module 228, in conjunction with the user communications module 226 and the content retrieval module 230, may cause the images 134 associated with the battlefield 312 to be downloaded and locally stored in the storage unit 210 of the device 204 in advance. In other embodiments, the application 216 may have downloaded the images 134 onto the storage unit 210 of the device 202 after the vehicle 300 reached the point C, and then caused the device 202 to transmit these images 134 to the device 204 via a local network (e.g., via Bluetooth). In this way, the user 304 may be able to enjoy the content 134 associated with the battlefield 312 notwithstanding the fact that the network N2 associated with the device 204 provides no data coverage between the points C and D.

At step 446, once the vehicle 300 passes the point E and the tour concludes, the social networking module 240 of the application 216 may cause some or all of the content 130 to be published on social media (e.g., on the Facebook® account, Instagram® account, et cetera, of the users 302 and 304). Friends and family of the users 302 and 304 may hence remain informed about the users' travels.

The resources monitoring module 236 may be robust, and in addition to having the ability to poll the networks N1 and N2 for connectivity, may also be able to purge location-based content 130 after it has been downloaded to the device 204. For example, if the free space on the storage unit 210 of the device 204 is low, at step 448, the resources monitoring module 236 may cause the content (e.g., the images 134) to be deleted from the storage unit 210 after it has been displayed. If, however, the storage unit 210 has ample free space, the logic of the resources monitoring module 236 may allow the content 134 to remain on the storage unit 210. The resource monitoring module 236, in determining whether or not to purge the content 134, may also take into account the size of the data files comprising the content 134. For example, where the data files comprising the content 134 are large, the resources monitoring module 236 may purge them from the storage unit 210 even when the storage unit 210 has ample free space.

Hence, the application 216 may, depending on the scope of the available services on the user computing devices 202 and 204, the availability of the networks N1 and N2, the size of the data files comprising the location-based content 130, et cetera, choose to fetch and cache the content 130 on the devices 202 and 204 in advance, or may stream the content 130 directly from the server 102.

At step 450, the application 216 may use the output devices 220 of the user computing devices 202 and 204 to inform the users 302 and 304 of other nearby travel destinations that may be of interest to the users 302 and 304. For example, the application 216 may convey to the users 302 and 304 via the output devices 220 of their respective user computing devices 202 and 204 that a historic library is within five miles (or ten miles, or another distance) of the point D, so that the users 302 and 304 may extend their tour if desired. The method 400 may then end at step 452.

While the system 100 has been illustrated herein via users 302 and 304 that are driving and/or walking, it will be appreciated that the workings of the system 100 are fully scalable and may be employed while the users 302 and 304 are biking, boating, flying, et cetera. Further, as noted above, the skilled artisan will appreciate that the method 400 is merely an example employed to illustrate the various facets of the system 100 for providing location-based content 130 to users, and that various steps of the method 400 may, in embodiments, be modified or omitted. In some embodiments, the content 130 may be sponsored by one or more sponsors. For example, the content 130, as it is displayed, may include a logo or message from the sponsor(s). The system 100 may thus provide an avenue for sponsors to promote their respective products and services at low cost.

Thus, as has been described, the system 100 may provide a flexible platform for presenting high-quality location-based information 130 synchronized to the surroundings. The system 100 may function as a multimedia communication tool that connects people directly to sites of interest in real time, and may further be used to foster an experiential understanding of places in an entertaining and convenient manner. The system 100 may also meet the communication and outreach needs of charitable organizations, public agencies, and businesses through the latest developments in location-aware content creation and delivery. Destination businesses (e.g., resorts) may use the system 100 to attract and educate visitors by presenting great audio stories along approach corridors; public agencies may use the system 100 inform visitors about the lands they manage; rental car agencies, bus companies, railroad companies, airline companies, et cetera, may interpret the passing landscapes for passengers to inspire their interest and help them pass the time. The system 100 may host all of these tours on its single shared platform, or license a customized white label platform for exclusive, branded use by a particular entity. In some embodiments, the system 100 may feature popular channels to further inform and entertain the users 302 and 304, such as an audio channel for conveying stories about significant historical landmarks to the users 302 and 304, a kids channel for entertaining children, et cetera.

Figure 11:
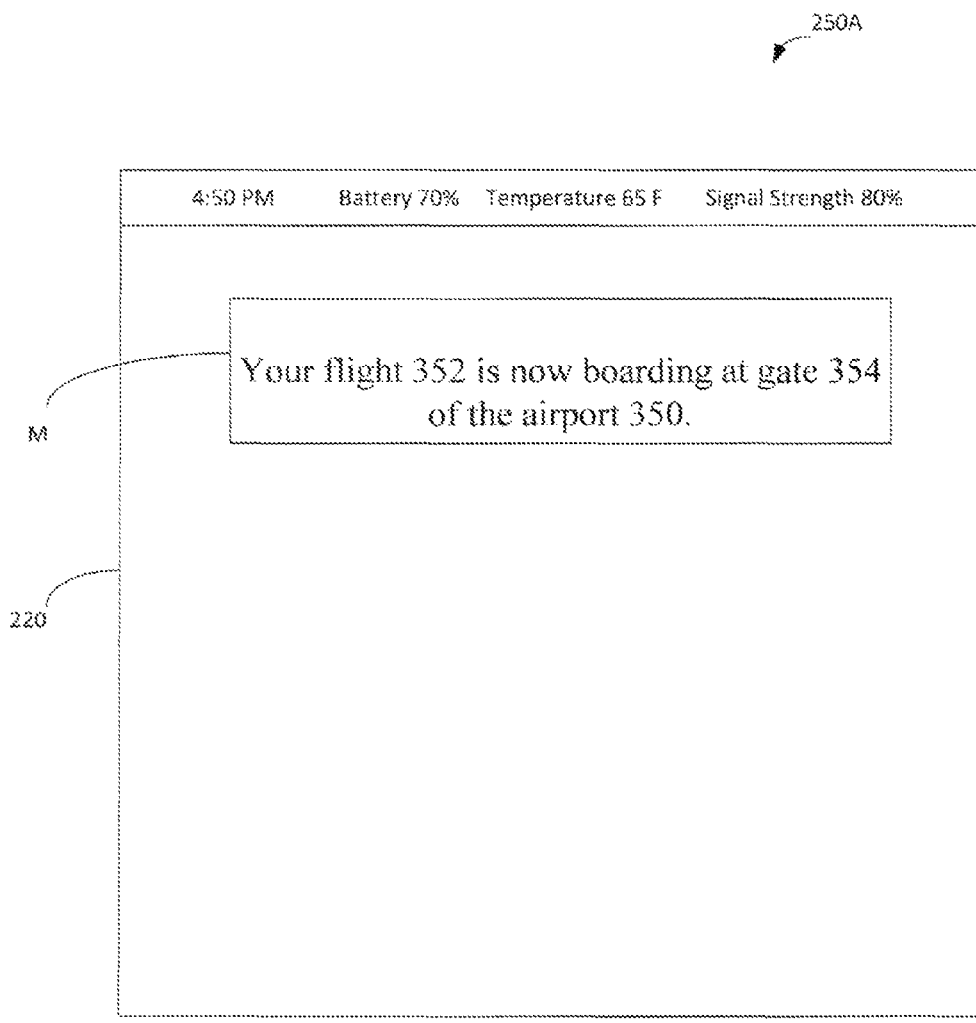
FIG. 11 is a schematic showing another exemplary interface of the client-side program of FIG. 5.

In some embodiments, the workings of the system 100 may be further customized depending on the nature of the tour. For example, where the users 302 and 304 are touring a famous airport 350, the system 100, in addition to providing the users 302 and 304 a guided tour as discussed above, may inform the users 302 and 304 about the status of their respective flights. For instance, as shown in the exemplary interface 250A in FIG. 11, a message M may be displayed by the application 216 on the output device 220 informing the user 302 that his flight 352 is now boarding at a gate 354 (or is delayed, cancelled, et cetera). Similarly, for example, the system 100 may provide the users 302 and 304 with updates regarding the weather, traffic, local events, et cetera.

Figure 12:
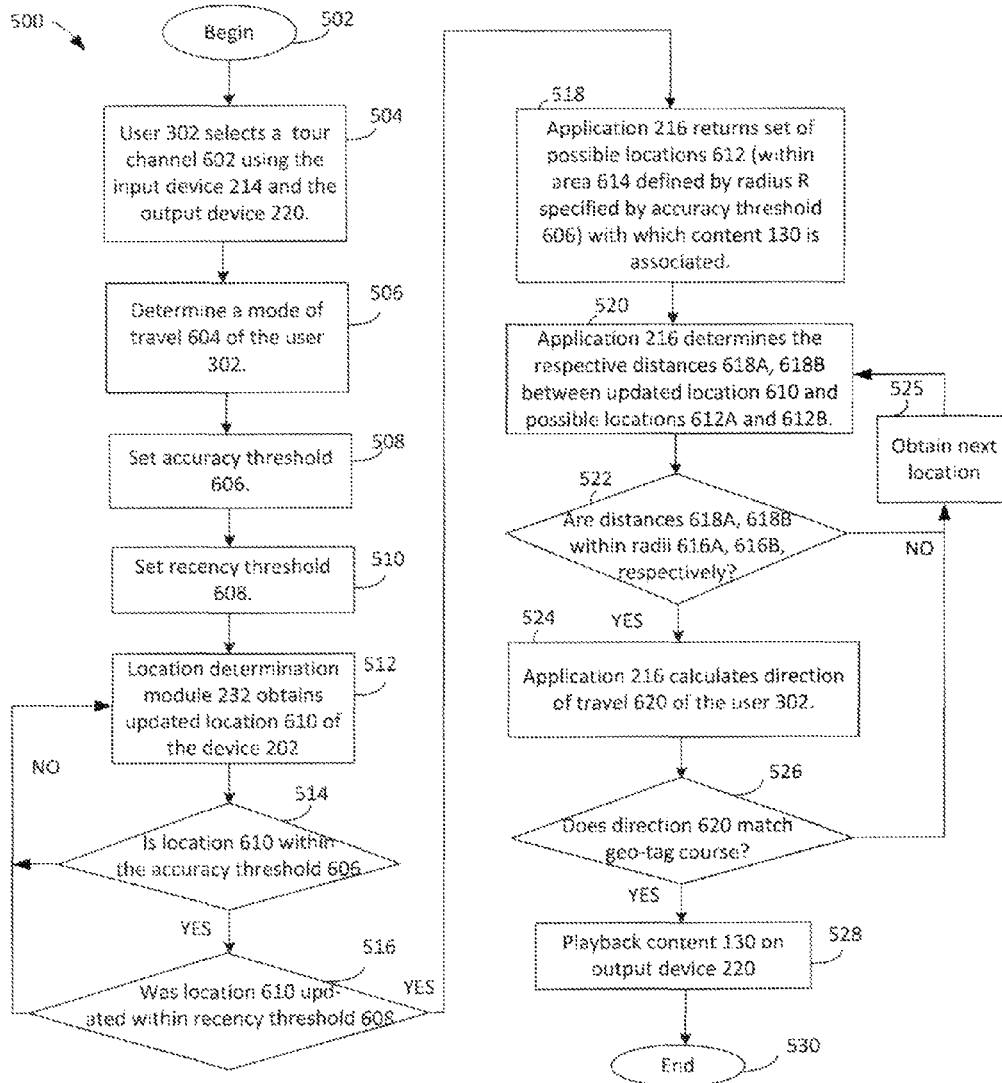
FIG. 12 shows a flowchart outlining various steps of a method for triggering content on the user communication device of FIG. 4, according to an embodiment.

As noted above with respect to the method 400, when delivering content 130 to the user computing devices 202 and 204, the system 100 may take into account various factors, such as the mode of travel of the users 302 and 304, their direction of travel, et cetera. FIG. 12 shows a method 500 that illustrates these concepts in additional detail. People of skill in the art will appreciate that the method 500, much like the method 400, is merely exemplary. Assume, for this example, that the user 302 is touring the Las Vegas Strip (or another popular destination), and that the user 302 is on foot.

Figure 13:
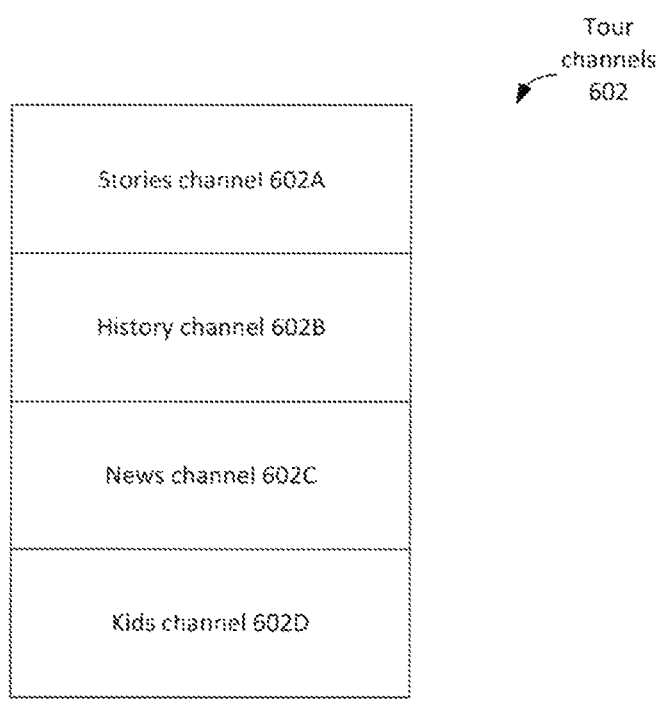
FIG. 13 shows a schematic outlining various types of tour channels.
Figure 14:
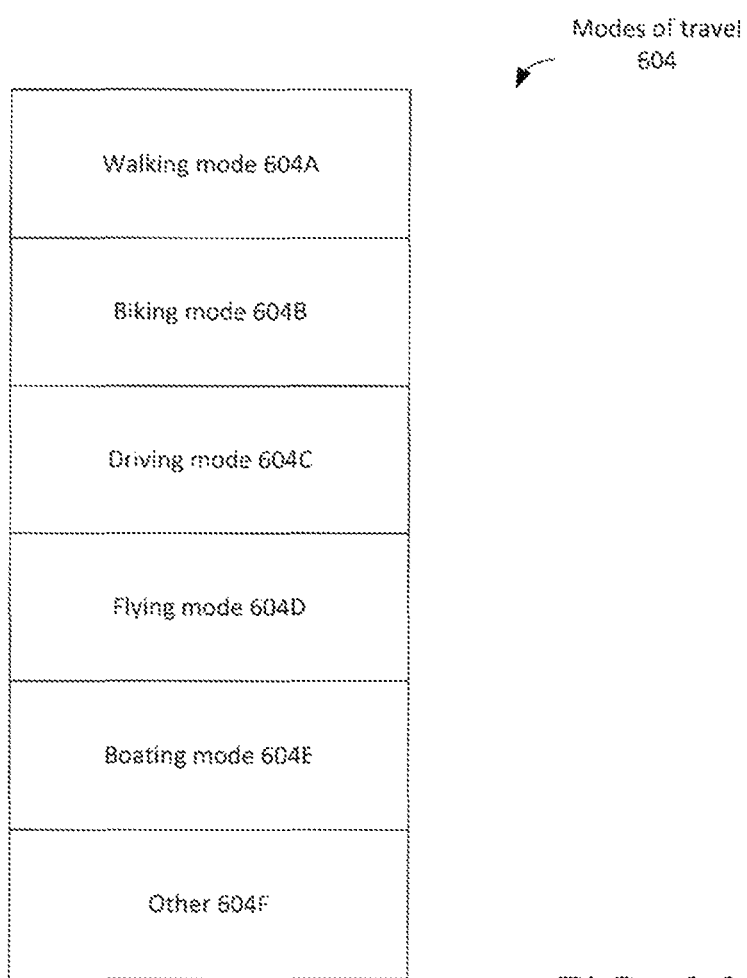
FIG. 14 shows a schematic outlining various modes of travel that a user may employ when taking a tour.

The method 500 may begin at step 502, and at step 504, the user 302 may be allowed to select via the input and output devices 214 and 220 a tour channel 602 (e.g., a best stories channel 602A, a history channel 602B, a news channel 602C, a kids channel 602D, et cetera; see FIG. 13). At step 506, the application 216 may ascertain a mode of travel 604 of the user 302. As noted above, the mode of travel 604 may include any method by which the user 302 may go from one point to another, such as for example, a walking mode 604A, a biking mode 604B, a driving mode 604C, a flying mode 604D, a boating mode 604E, or any other mode 604F of travel now known or later contemplated (see FIG. 14). In some embodiments, the user 302 may be allowed to manually specify his mode of travel 604 using the input device 214 and the output device 220. Assume, for this example, that the mode of travel 604 of the user 302 is determined to be the walking mode 604A.

At steps 508 and 510, the application 216 (using, e.g., the processor 208 and the content communications (or another) module 228) may set an accuracy threshold 606 and a recency threshold 608, respectively. In some embodiments, the accuracy threshold 606 may comprise a unit for measuring distance (e.g., 0.5 meters, 2 feet, 1 mile, et cetera) and the recency threshold 608 may comprise a unit for measuring time (e.g., 1 millisecond, 10 seconds, et cetera). The values for the accuracy threshold 606 and the recency threshold 608 may depend on the mode of travel 604. For example, if the mode of travel 604 is the walking mode 604A, the accuracy threshold 606 may be selected to be 3 meters and the recency threshold 608 may be selected to be 2 seconds. If, for example, the mode of travel 604 is the driving mode 604C, the accuracy threshold 606 may be selected to be 15 meters and the recency threshold may be selected to be 12 seconds. It will be appreciated from the discussion herein that the values for each of the accuracy threshold 606 (which in effect broadly defines a radius within which the device 202 is located) and the recency threshold 608 (which outlines how quickly the location of the device 202 is to be updated) may be smaller for the walking mode 604A as compared to the driving mode 604C.

At step 512, the application 216 (using, e.g., the location determination module 232 and the processor 208 as discussed above) may obtain an updated location 610 of the device 202. At step 514, the application 216 (using, e.g., the content communications (or another) module 228) may determine whether the location 610 is within the accuracy threshold 606. At step 516, the application 216 may determine whether the location 610 was updated within the recency threshold 608. If the answers to both the questions posed at steps 514 and 516 are in the affirmative, step 518 may next be performed; otherwise, the application 216 may return to step 512 to obtain the updated location 610 of the device 202.

At step 518, the application 216 (in conjunction with the application 116, for example) may return a set of possible locations 612 within an area 614 defined by a radius R specified by the accuracy threshold 606 with which any content 130 is associated. As will be appreciated, because the mode of travel 604 is the walking mode 604A, the radius R defined by the accuracy threshold 606 is relatively small; this ensures that the resources of the device 202 are not needlessly wasted by, for example, considering locations miles away from the updated location 610. Had the mode of travel 604 at step 506 been determined to be the driving mode 604C, however, a larger set of possible (i.e., potential) locations 612 (within an area defined by a larger radius R specified by the accuracy threshold 606) may have been returned at step 518. Assume, for example, that at step 518, two possible locations 612A and 612B are returned, each having a geo-tag radius 616A and 616B, respectively. Assume further that the user 302 is walking towards location 612A and away from location 612B.

At step 520, the distance between the updated location 610 and the possible locations 612 may be determined. In this example, thus, at step 520, a distance 618A between the updated location 610 and the possible location 612A may be determined, along with a distance 618B between the updated location 610 and the possible location 612B. At step 522, the application 216 may ensure that the distances 618A and 618B are within the geo-tag radii 616A and 616B, respectively. At step 524, the direction of travel 620 (e.g., north, south, northeast, et cetera) of the user 302 may be determined, and if it matches the geo-tag course as determined at step 526, at step 528, the content 130 associated with the location 612A may be played on the output device 220. If, on the other hand, it is determined at step 522 that the distance is not within the geo-tag radius or at step 526 that the direction of travel of the user 302 does not match the geo-tag course, the method 500 may move to step 525 where the application 216 may obtain the next location before it returns to step 520. Steps 512-526 may be repeated once the playback of the content 130 concludes, for the entire duration of the tour. The method 500 may then end at step 530. Thus, as has been described, triggering of the content 130 by the system 100 may be both accurate and efficient, and may take into account various factors such as the user's mode and direction of travel.

In some embodiments, the application 216 (along with the application 216, for example) may utilize Keyhole Markup Language ("KML") overlays in displaying a map 702 of a given area 704 where the user 302 is located. Those skilled in the art appreciate that KML files may be used to expose data (e.g., the location and type of a point of interest) on the map 702 in various ways. Focus is directed now to FIG. 15, which shows another exemplary interface 250B of the application 216. Much like the interface 250 shown in FIG. 10, the interface 250B is exemplary only and is not intended to be limiting.

Figure 15:
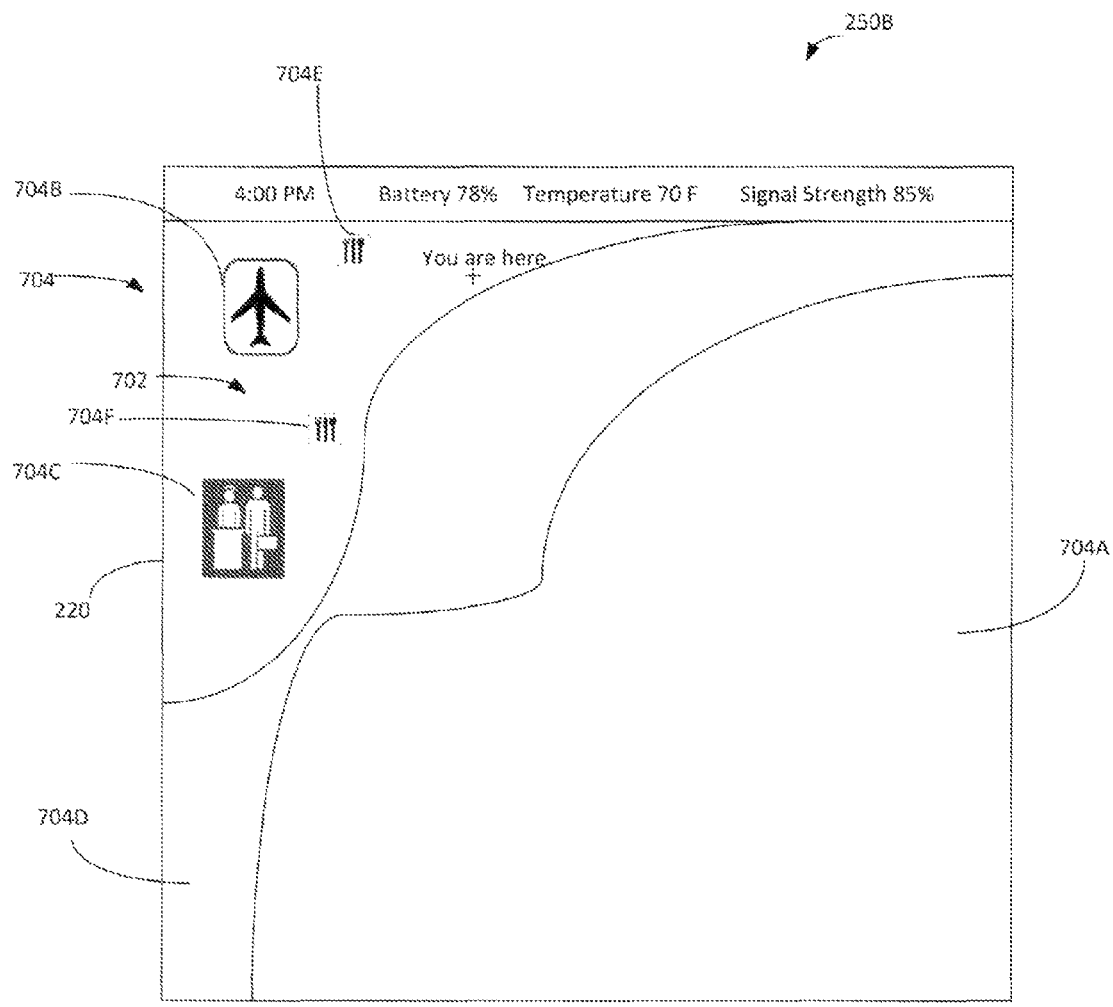
FIG. 15 shows a schematic showing yet another exemplary interface of the client-side program of FIG. 5.

As illustrated in FIG. 15, assume that the area 704 comprises a forest 704A, an airport 704B, a hospital 704C, a river 704D, and restaurants 704E and 704F. Each of these may be highlighted for the user 302 on the map 702 in various ways. In some embodiments, for example, color coding may be utilized (e.g., the forest 704A may be displayed in green color, the river 704D may be displayed in blue color, et cetera). In other embodiments, alternatively or in addition, symbols may be used to conveniently convey the import of certain (or all) locations on the map 702 (such as those depicting the airport 704B, the hospital 704C, the restaurants 704E and 704F, for example). In other embodiments still, text may be superimposed onto the map 702 to underscore the various locations on the map 702. The user 302 may in some embodiments be allowed to select the type of locations that he wants to be highlighted on the map 702; for example, at the request of the 302, the application 216 may highlight every hospital (or every gas station, restaurant, convenience store, et cetera) on the map 702. Thus, for instance, if the user is touring a particular location and wishes to find a restaurant within five miles of his current location, he may direct the application 216 to display on the output device 202 the map 702 with all such restaurants highlighted thereon.

While not required, in some embodiments, the user 302 may be allowed to rate his various destinations. For example, the user 302 may be allowed to rate the restaurant 704E on a scale from one to five. Such data may be compiled by the statistics module 126, and used for the benefit of the user 302 and other users (e.g., the user 304). For example, if the user 302 is in the area 704 a second time and directs the application 216 to display nearby restaurants on the output device 220, the restaurant 704E may be flagged by the application 216 on the map 702 to indicate to the user 302 that he previously visited and enjoyed (or disliked) the restaurant 704E. Similarly, such data (e.g., ratings) may be displayed for other users (e.g., the user 304) so that they may benefit from the experiences of those who were in the area 704 before the user 304.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for communicating location-based content to a user, comprising:
   an information system for communicating the content to the user, comprising:
      an input device, an output device, a networking device, first computer programming, and a processor in data communication with non-transitory computer memory having location-based content; and
   a computing apparatus, comprising:
      an input device, an output device, a networking device, a navigation system, a mobile communication system, second computer programming, a media file, and a processor in data communication with non-transitory computer memory;
   wherein the second computer programming provides instructions for:
      setting an accuracy threshold and a recency threshold based on a speed of travel of the user;
      in cooperation with the first computer programming, causing the computing apparatus output device to present the location-based content when a current location of the computing apparatus is within the accuracy threshold and was updated within the recency threshold, the current location of the computing device being determined by the navigation system;
      causing the computing apparatus to automatically play the media file on the computing apparatus output device when the current location is not within the accuracy threshold; and
      publishing the location-based content on a social media or other public platform.

2. The system of claim 1, wherein the navigation system is a global positioning system and the mobile communication system is a short messaging system.

3. The system of claim 1, wherein the media file is one of a music file, a video file, an audio file, a text file, and an image file.

4. The system of claim 1, wherein the second computer program includes instructions for automatically removing the location-based content from the computing apparatus' computer memory after it has been played on the computing apparatus output device.

5. The system of claim 1, wherein the second computer program includes instructions for removing the location-based content from the computing apparatus' computer memory after the computing apparatus' computer memory reaches a predetermined storage threshold.

6. The system of claim 1, wherein the second computer program provides further instructions for determining the direction of travel of the user.

7. The system of claim 6, wherein the first computer programming in cooperation with the second computer programming includes instructions for presenting the location-based content to the computing apparatus before the computing apparatus has reached the current location.

8. A system for communicating location-based content to a user, comprising:
an information system for communicating the content to the user, comprising:
an input device, an output device, a networking device, first computer programming, and a processor in data communication with non-transitory computer memory having location-based content; and
a computing apparatus, comprising:
an input device, an output device, a networking device, a navigation system, a mobile communication system, second computer programming, and a processor in data communication with non-transitory computer memory;
wherein, irrespective of the computing apparatus being in real-time communication with a network, the second computer programming provides instructions for:
setting an accuracy threshold and a recency threshold based on a speed of travel of the user;
in cooperation with the first computer programming, causing the computing apparatus output device to present the location-based content when a current location of the computing apparatus is within the accuracy threshold and was updated within the recency threshold, the current location of the computing device being determined by the navigation system; and
wherein the second computer programming further provides instructions for:
causing the computing apparatus output device to present user-specific content; and
publishing the user-specific content on a social media or other public platform.

9. The system of claim 8, wherein the cooperation with the first computer programming is in real time.

10. The system of claim 8, wherein a value of the accuracy threshold is increased with increased speed of travel.

11. The system of claim 8, wherein the information includes at least one of outreach information and an option for allowing the user to make a donation.

12. The system of claim 11, wherein the second program includes instructions for allowing the user to input location data related to the user's experience at the current location.

13. The system of claim 12, wherein the second program further includes a statistics module for compiling user-input location data and presenting the location-based content to the user at the current location.

14. The system of claim 13, wherein the second computer programming provides further instructions for determining the direction of travel of the user.

15. The system of claim 8, wherein the location-based content is tailored to the user based on at least one of the user's predetermined age and a user's predetermined preferences.

16. A system for communicating various location-specific content to a user, comprising:
an information system for communicating the content to the user, comprising:
an input device, an output device, a networking device, first computer programming, and a processor in data communication with non-transitory computer memory having location-specific content; and
a computing apparatus, comprising:
an input device, an output device, a networking device, a navigation system, a mobile communication system, second computer programming, a first media file, and a processor in data communication with non-transitory computer memory;
wherein:
the second computer programming in cooperation with the first computer programming provides instructions for causing the computing apparatus output device to present some location-specific content based on a first location of the computing apparatus; and
the second computer programming in cooperation with the first computer programming provides instructions for causing the computing apparatus output device to present other location-specific content based on a second location of the computing apparatus, the other location-specific content being provided to the computing apparatus before the computing apparatus reaches the second location;
the second computer programming includes instructions for:
causing the computing apparatus to automatically play a complete portion of the first media file on the computing apparatus output device when the computing apparatus is between the first location and the second location; and
publishing a portion of at least one of the some location-specific content of the first location and the other location-specific content of the second location on a social media or other public platform.

17. The system of claim 16, wherein the computing apparatus includes a second media file, and wherein the second computer programming includes instructions for playing a complete portion of the second media file on the computing apparatus output device when the complete portion of the first media file has been played and before the computing apparatus reaches the second location.

18. The system of claim 17, wherein the location-specific content is presented to the user at predetermined time intervals based on the speed of travel of the user.

19. The system of claim 18, wherein the location-specific content is tailored to the user based on at least one of the user's predetermined age and a user's predetermined preferences.

20. The system of claim 19, wherein the computing apparatus is one of a cellphone or a tablet.

* * * * *